Jan. 21, 1969    T. W. BROWN    3,422,504
SUSPENDER CLIP
Filed May 9, 1967    Sheet 1 of 2

INVENTOR
THOMAS WAGG BROWN
By Jacobi & Davidson
ATTORNEYS

United States Patent Office 3,422,504
Patented Jan. 21, 1969

3,422,504
SUSPENDER CLIP
Thomas Wagg Brown, 2 Langham Road, Maitland, Cape Town, Cape Province, Republic of South Africa
Filed May 9, 1967, Ser. No. 637,104
Claims priority, application Republic of South Africa, May 16, 1966, 66/2,836
U.S. Cl. 24—245                     1 Claim
Int. Cl. A44b *17/00*

ABSTRACT OF THE DISCLOSURE

This invention relates to clips, and more particularly suspender clips suitable to be used on suspender belts for holding up ladies' stockings.

A suspender clip according to the invention is preferably made of plastic, such as nylon, is substantially flat and comprises a flat base part with an aperture, and a flat tab with an enlarged but flat engagement head. The base part and the tab are disposed co-planar or in superimposed relationship. The edges of both the aperture and the head are serrated, and the head is slightly larger than the aperture, so that its serrated edge will project beyond the periphery of the aperture to engage a stocking between the engagement head and the aperture.

BACKGROUND OF THE INVENTION (1) *Field of the invention*

The invention thus falls within the field of fastening devices for supporting and adjusting wearing apparel, and more particularly fastening devices to be provided on suspenders for holding up ladies' stockings.

(2) *Description of the prior art*

The majority of suspender clips known to the applicant are of substantial thickness, and the outlines of the suspender clips are often visible when tight fitting garments are worn.

It is an object of this invention to provide a suspender clip in which this disadvantage may be avoided or at least mitigated.

SUMMARY OF THE INVENTION

According to the invention there is provided a suspender clip which comprises a substantially flat base part having an aperture, and a substantially flat tab having an enlarged but flat engagement portion provided with outwardly projecting engagement means and capable of passing through the aperture of the base part, the tab being arcuately displaceable between an open position in which the engagement portion is spaced from the base part and a closed position in which the tab is co-planar with or closely spaced from the base part with the engagement portion in register with the aperture and with the engagement means projecting beyond the periphery of the aperture.

In practice, a stocking is engaged and held by the clip according to the invention in the following manner: The tab with the enlarged engagement portion is passed through the aperture of the base part to the other side of the base part by twisting the tab sideways, and the tab is pulled away from the other side of the base part; the welt or band of the stocking to be engaged is inserted in between the tab and the base part, and the tab is passed back through the aperture. In this manner the stocking is also partly pulled through the aperture and is clamped in position by the engagement means which prevent the tab from slipping back through the aperture to the other side.

The engagement means on the engagement portion may be in the form of a plurality of outwardly extending projections arranged around the periphery of the engagement portion. In one form, the engagement portion may be in the form of a flat substantially circular head having a zig-zagged or serrated edge, the zig-zag formations or serrations constituting the engagement means. If desired, the aperture in the base part may also have a serrated or zig-zagged edge, to improve the gripping of the stocking to be held in position.

The clip may be made of any suitable material having a degree of resilience. Preferably the clip may be made of a synthetic resin material, such as nylon, polyethylene, or the like.

In one embodiment the clip may comprise a flat strip of synthetic resin material, the aperture being provided in the one end region thereof, and the other end region being formed into a tab with an enlarged engagement head at its free end which is slightly larger than the aperture, and the peripheral edges of both the engagement head and the aperture being serrated; the strip further being folded upon itself along an intermediate transverse fold line, so that the engagement head of the tab is positioned in register with the aperture, and being secured in that position, e.g. by welding.

In another embodiment, the clip may comprise an elongated and flat piece of synthetic resin material, a longitudinally extending tab being cut from the central region of the piece of material in such a manner that one end of the tab is not severed from the rest of the piece of material and an enlarged engagement head is formed at the free end of the tab, the peripheral edges of both the engagement head and the aperture further being provided with serrations which are cut at an inclination relative to the faces of the piece of material, so that the serrations of the engagement head project beyond the serrations of the aperture when the engagement head is in register with the aperture.

The clip may further be provided with connection means for connecting it to the suspender loop or tab normally provided. The connection means may be in the form of a loop or welt formed on the clip, or a slot or other suitable connection means.

BRIEF DESCRIPTION OF THE DRAWINGS

The invention and the manner in which it may be put into practice will now be described by way of example, with reference to the accompanying drawings.

In the drawings.

DESCRIPTION OF THE PREFERRED EMBODIMENTS

Figure 3:
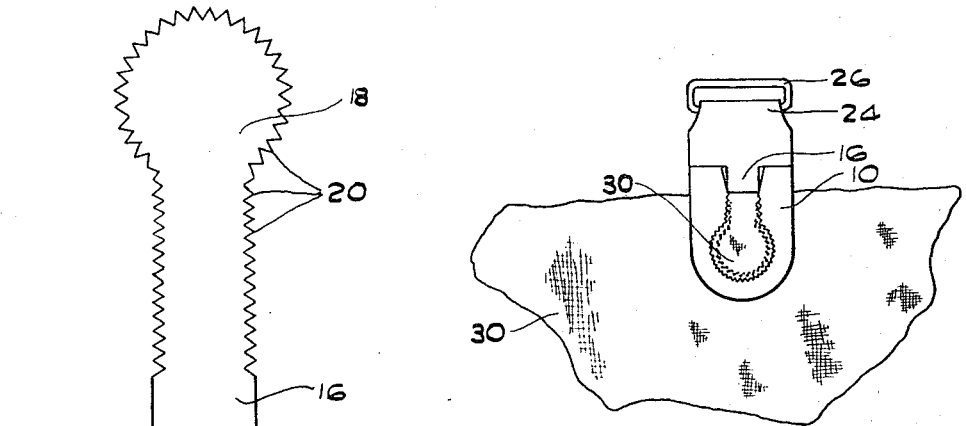
FIGURE 3 is a top plan view of the suspender clip according to FIGURES 1 and 2, shown in engagement with a stocking band.

Referring to the drawings, a suspender clip according to the invention comprises a substantially flat base part 10 having an aperture 12 with a slot 14 leading from the aperture 12, and a substantially flat tab 16 having a flat, enlarged engagement head 18. It will be noted that the engagement head 18 is slightly larger than the aperture 12.

The edges of both the aperture 12 and part of the slot 14, and the engagement head 18 and part of the tab 16 are serrated to form zig-zag projections 20. The projections 20 on the engagement head 18 constitute outwardly projecting engagement means.

Figure 1:
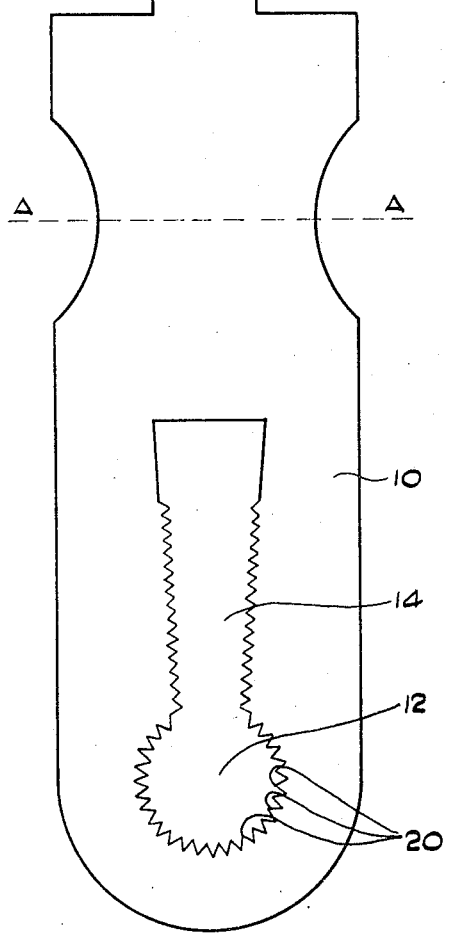
FIGURE 1 is a top plan view of one embodiment of a suspender clip according to the invention, in the unsecured position.
Figure 2:
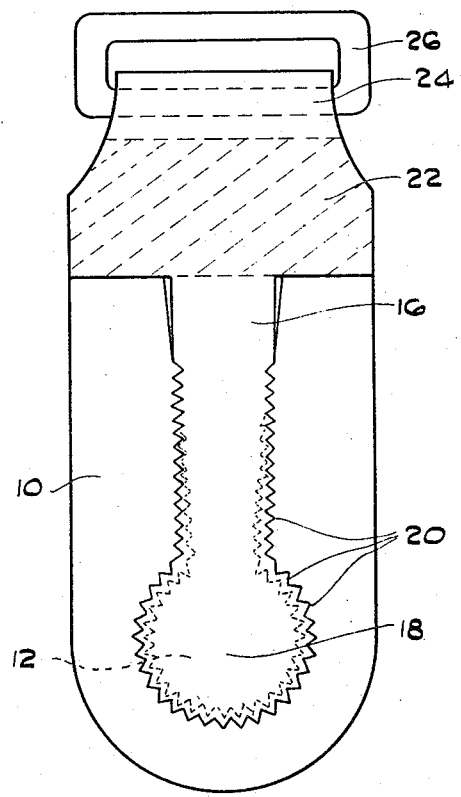
FIGURE 2 is a top plan view of the suspender clip of FIGURE 1, in the secured position.

In the embodiment shown in FIGURES 1 to 3, the tab part is folded onto the base part 10 along the line A—A, so that the engagement head 18 is in register with the aperture 12, as shown in FIGURE 2. The two superimposed parts are then secured together, such as by welding in zone 22. The welding is carried out in such a manner that a loop 24 is left, by means of which the clip may be secured to a suspender loop or tab, such as via link 26.

Figure 4:
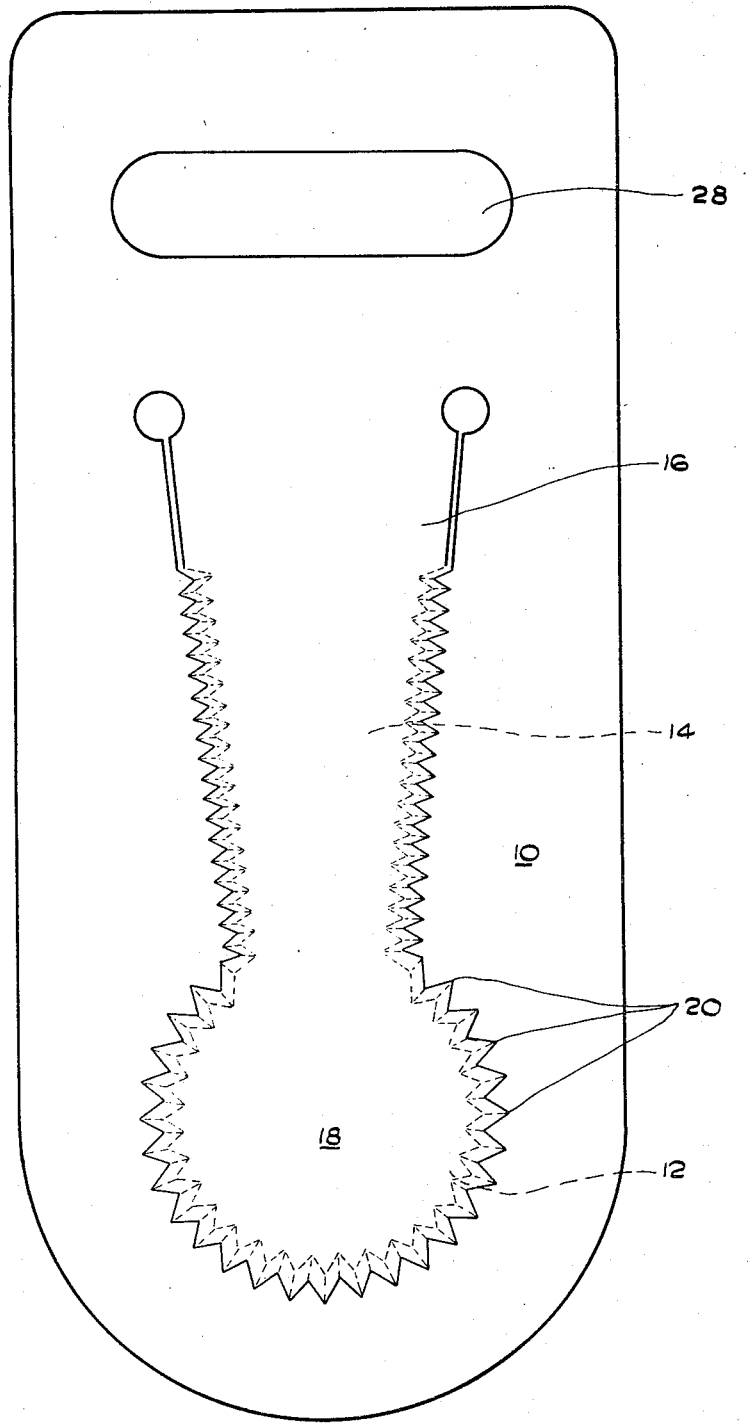
FIGURE 4 is a top plan view of a different embodiment of a suspender clip according to the invention.

In the embodiment shown in FIGURE 4, the tab 16 with its engagement head 18, is cut out of the base part 10 to leave the aperture 12 and slot 14. Both the edges of the engagement head 18 and part of the tab 16, and the aperture 12 and part of the slot 14, are provided with serrations to form zig-zag formations 20. The serrations are cut at an inclination to the top and bottom faces of the clip, so that the tab 16 and engagement head 18 are slightly larger than the aperture 12 and slot 14. Again the formations 20 on the engagement head 18 institute outwardly projecting engagement means. Connection means in the form of a slot 28 is provided, by means of which the clip may be connected to a suspender loop or tab (not shown).

In use, the tab 16 and engagement head 18 are pulled through the aperture 12 and slot 14 to the other side of the clip; the band of a stocking is inserted between the tab 16 and the clip, and the tab 16 and head 18 with the stocking are passed through the aperture 12 and slot 14 to the original side of the clip. The stocking band is thereby pulled partly through the aperture 12 and slot 14, and is held in position by the engagement head 18 with its engagement means in the form of the projections 20.

I claim:

1. A suspender clip which comprises an elongated and flat piece of synthetic resin material, a longitudinally extending tab being formed from the central region of the piece of material in such a manner that the one end of the tab is not severed from the rest of the piece of material and an enlarged rounded but flat engagement head is defined at the free end of the tab, the remaining part of the piece of material constituting a flat base part having an aperture, the engagement head being adapted to pass through the aperture, and the peripheral edges of both the engagement head and the aperture being provided with serrations which are formed at an inclination relative to the faces of the piece of material such that the serrations of the engagement head project beyond the periphery of the aperture when the engagement head is in register with the aperture; the tab being arcuately displaceable between an open position in which the engagement head is spaced from the base part, and a closed position in which the tab is in close proximity to the base part with the engagement head in register with the aperture and the serrations of the engagement head projecting beyond the periphery of the aperture.

References Cited

UNITED STATES PATENTS

| | | | |
|---|---|---|---|
| 472,343 | 4/1892 | Eccleston. | |
| 824,332 | 6/1906 | Barnum | 24—246 |
| 1,076,675 | 10/1913 | Jennings | 24—245 |
| 1,828,041 | 10/1931 | Hamacher | 24—245 |
| 1,854,149 | 4/1932 | Laencher. | |
| 1,874,844 | 8/1932 | Adler. | |
| 2,021,619 | 11/1935 | Waters et al. | |
| 3,139,662 | 7/1964 | Barton | 24—246 |
| 3,177,550 | 4/1965 | Borgeson | 24—245 |

FOREIGN PATENTS

| | | |
|---|---|---|
| 843,577 | 3/1939 | France. |
| 887,698 | 8/1953 | Germany. |

DONALD A. GRIFFIN, *Primary Examiner.*